Figure 2:
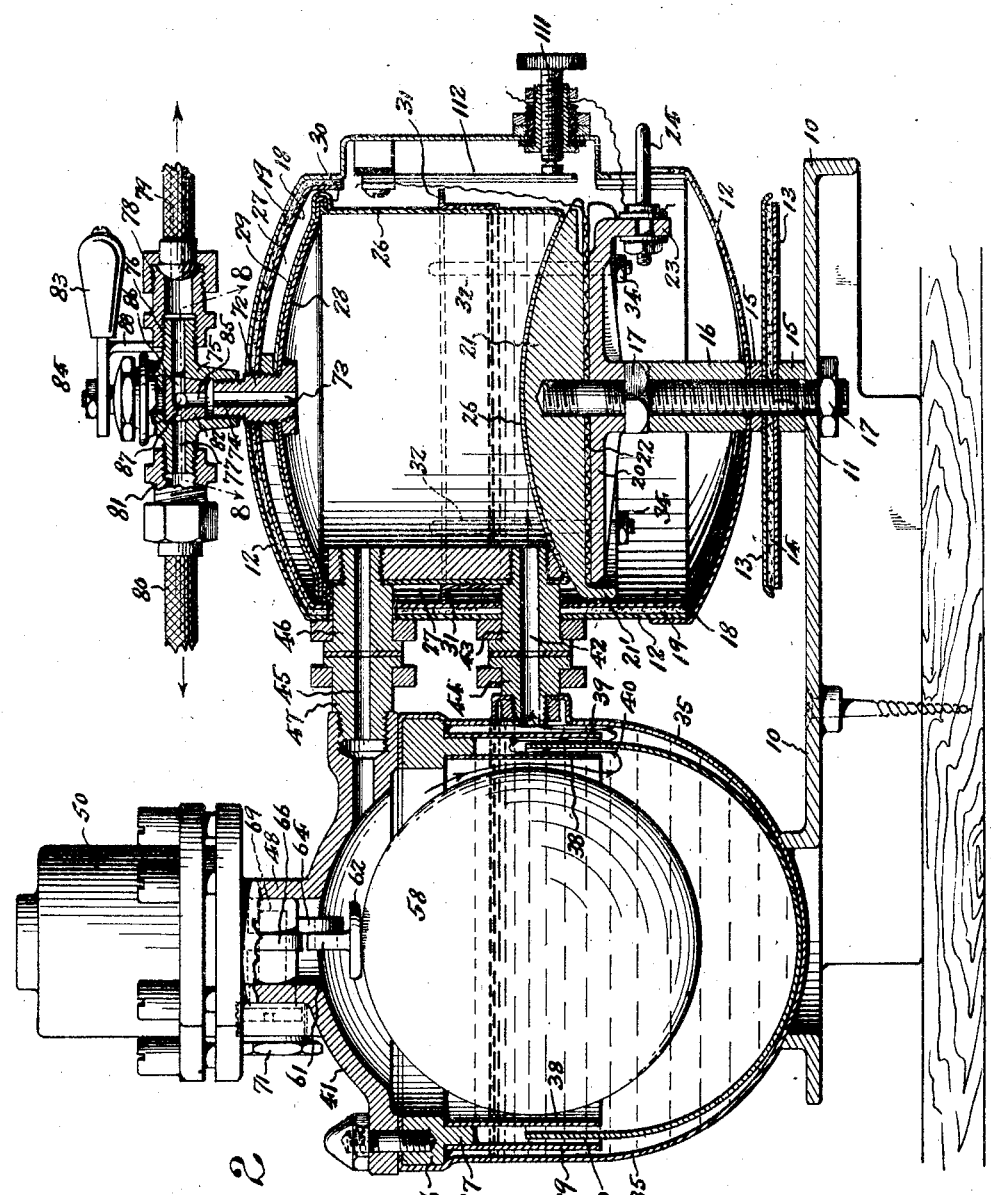

Aug. 28, 1928.
C. A. BREWER
1,682,320
ELECTRIC STEAM GENERATOR
Filed Oct. 24, 1924
3 Sheets-Sheet 1
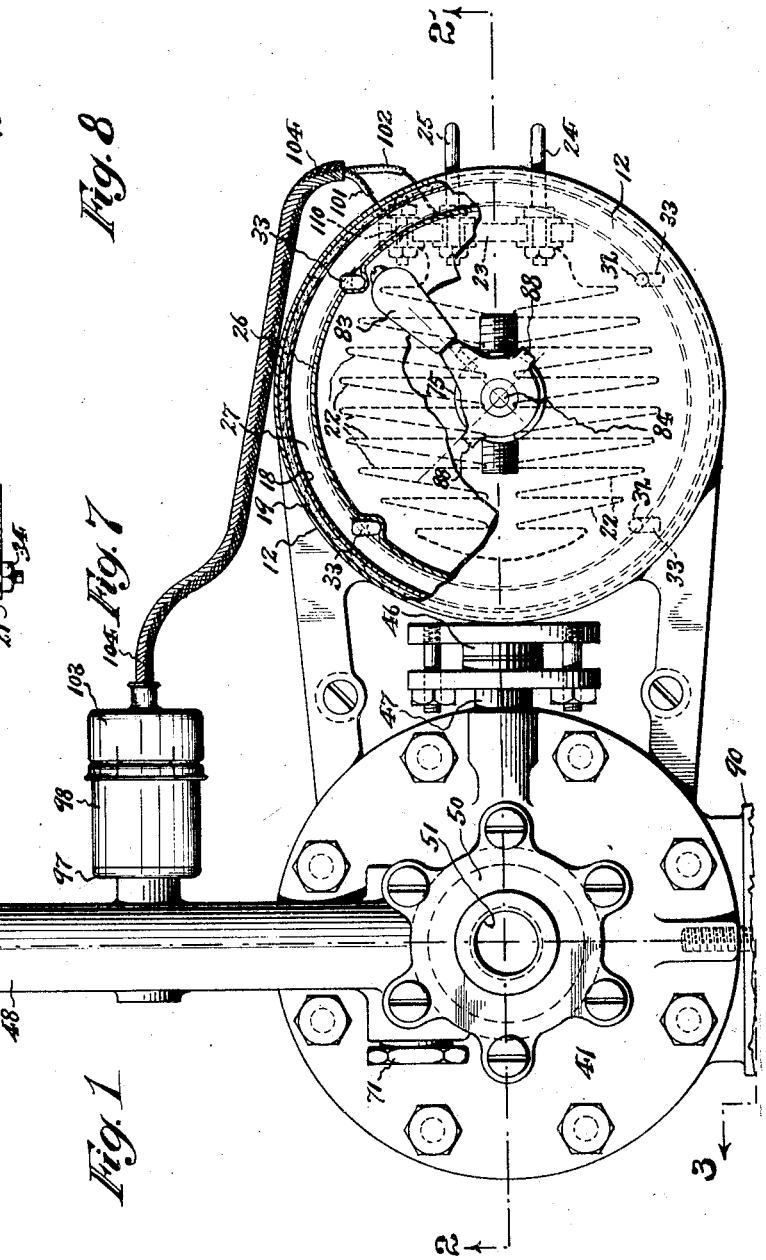
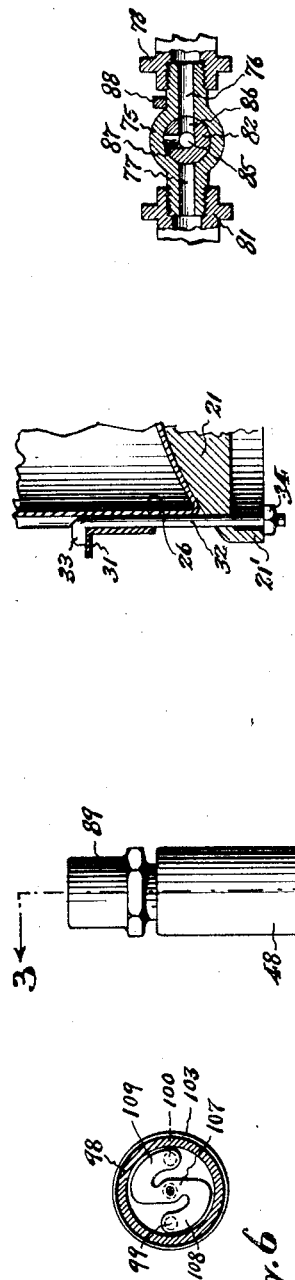
INVENTOR
Charles A. Brewer
BY
Frautzel and Richards,
ATTORNEYS Aug. 28, 1928.

C. A. BREWER 1,682,320

ELECTRIC STEAM GENERATOR

Filed Oct. 24, 1924

3 Sheets-Sheet 2

INVENTOR
Charles A. Brewer
BY
Kraeutzef and Richards
ATTORNEYS

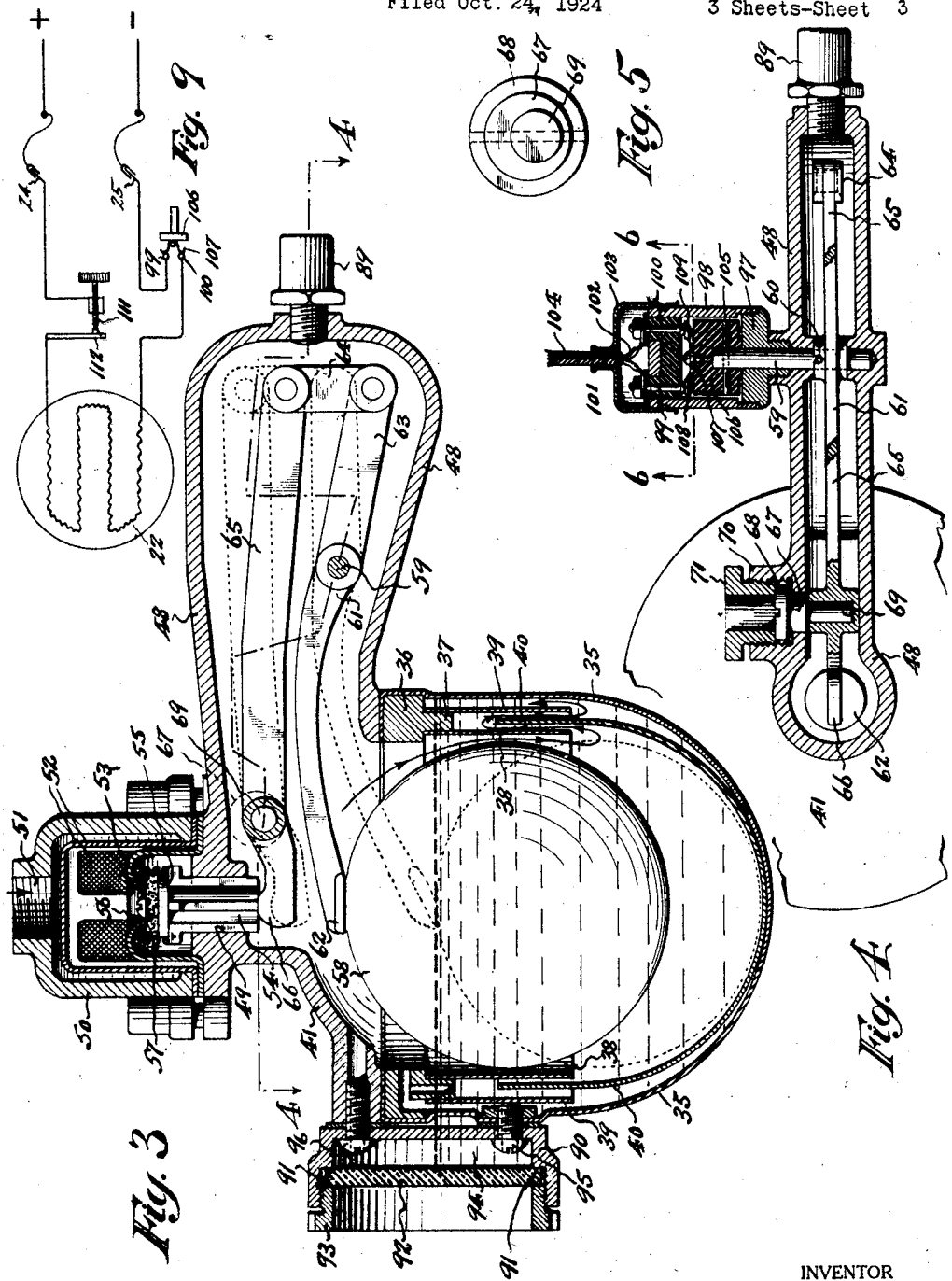

Patented Aug. 28, 1928.

1,682,320

UNITED STATES PATENT OFFICE.

CHARLES A. BREWER, OF NOROTON HEIGHTS, CONNECTICUT, ASSIGNOR TO CANNON ENGINEERING CO., OF BROOKLYN, NEW YORK, A CORPORATION OF NEW YORK.

ELECTRIC STEAM GENERATOR.

Application filed October 24, 1924. Serial No. 745,594.

This invention relates, generally, to a novel construction of electrically heated steam generator or boiler for serving low pressure steam to steam appliances of various kinds, such, for example, as steam pressing irons; and the invention has reference, more particularly, to an electrically heated steam generator having a novel feed water reservoir and regulator in combination therewith.

The invention has for its principal object to provide a compact electrically heated steam generator or boiler having a separate feed water reservoir provided with a novel float actuated water control means, which is adjustable for predetermining the desired level in the boiler compartment.

The invention has for a further object to provide in combination with the separate boiler compartment and feed water compartment of the generator a means for equalizing pressures in both compartments, so that the same level of water is maintained in both compartments.

The invention has for a still further object to provide a novel arrangement and construction of electric heating elements in combination with the boiler compartment of the generator, together with an emergency electrical cut-out actuated in connection with the float operated water control means, whereby the heating element will automatically cease to function in the event of the failure of the water supply.

Other objects of this invention, not at this time more particularly enumerated, will be clearly understood from the following detailed description of the same.

With the various objects of this invention in view, the same consists, primarily, in the novel electric steam generator or boiler apparatus hereinafter set forth; and the invention consists, furthermore, in the several novel arrangements and combinations of the various devices and parts, as well as in the details of the construction of said parts, all of which will be hereinafter more fully described in the following specification, and then finally embodied in the claims appended thereto.

The invention is clearly illustrated in the accompanying drawings, in which:—

Figure 1 is a plan or top view of the novel electric steam generator apparatus, made according to and embodying the principles of this invention; Figure 2 is a vertical longitudinal section, taken on line 2—2 in said Figure 1; Figure 3 is a transverse vertical section, taken on line 3—3 in said Figure 1; Figure 4 is a fragmentary horizontal section, taken on line 4—4 in said Figure 3; Figure 5 is an enlarged detail view of the adjustable fulcrum pin of the float actuated lever mechanism for controlling the water supply; Figure 6 is a detail transverse section, taken on line 6—6 in Figure 3; Figure 7 is a fragmentary sectional view of the boiler shell suspension means; Figure 8 is a fragmentary horizontal section of the steam discharge valve of the generator, said section being taken on line 8—8 in Figure 2; and Figure 9 is an electric wiring diagram, showing the circuit and controls for the electric heating elements of the generator.

Similar characters of reference are employed in all of the hereinabove described views, to indicate corresponding parts.

Referring now to said drawings, the reference character 10 indicates a base upon which the novel steam generator apparatus is mounted. Secured to said base 10, so as to extend vertically upward therefrom is a stud-bolt 11. The reference character 12 indicates an outer casing or shell for enclosing the boiler proper and its electric heating element. Said casing or shell 12 is preferably made of sheet metal, and is provided in its bottom end with a central opening through which the upper free end of the stud-bolt 11 extends. If desired, a heat resistant shield, comprising a pair of metallic plates 13, intermediate which is inserted a sheet of asbestos 14, or like heat insulation material, may be interposed between said casing or shell 12 and said base 10, by engaging said shield upon said stud-bolt 11 between spacing collars 15. The casing or shell 12 is stopped against the uppermost collar 15, and arranged upon the end portion of said stud-bolt 11, which projects into the lower interior of said casing or shell 12, is a spacing sleeve 16. The parts thus described are secured together by upper and lower nuts 17 which are threaded upon said stud-bolt 11. Said casing or shell 12 may be provided with an inner lining 18, intermediate which and the main body of the casing or shell is disposed a suitable heat resistant material 19, such as asbestos, thus increasing the efficiency of the casing or shell as a heat insulation means to conserve the heat generated by the electrical heating means in connection with the boiler proper which is enclosed by said casing or shell.

The reference character 20 indicates a centrally perforated lower heater plate or support, which is engaged upon or over the upper free end of said stud-bolt 11; and the reference character 21 indicates an upper heater plate, which is threaded on the free end of said stud-bolt 11. Interposed between said upper and lower heater plates are electric heater wires 22, or any other suitable form of conductive heater elements. Said lower heater plate 20 is provided at one side with a depending supporting flange 23 for mounting the male contact plugs or terminals, comprising a positive plug or terminal 24 and a negative plug or terminal 25, the respective free ends of which project through suitable openings in the casing or shell 12 to exteriorly dispose the same to receive the operative engagement therewith of suitable contact making or coupling means (not shown) for coupling the electric heating means with feed or service wires leading from a suitable source of electrical energy.

The boiler proper of the generator comprises a copper boiler shell 26, of a diameter somewhat less than the inner diameter of the outer casing or shell 12, so as to provide an insulating air space 27 intermediate the former and the latter. The bottom of said boiler shell 26 rests in contact with the upper heater plate 21 so that the heat generated by the electric heater wires 22 is transferred to the boiler shell 26. The upper end of said boiler shell 26 is closed by a copper dome plate 28, which is reenforced and strengthened by an outer superimposed steel dome plate 29, the registered marginal edges of the boiler shell 26 and said superimposed dome plates being preferably joined by a turned over or interlocking seam bead or joint 30.

Interposed between the external sides of said boiler shell 26 and the internal sides of said casing or shell 12, and preferably secured to the former, is an annular spacing flange 31, which also serves to brace the sides of said boiler shell. As a further means for securely supporting and bracing said boiler shell, while at the same time drawing its bottom end tightly down in firm and close engagement with the upper heating plate 21, there are provided a plurality of vertical ties or draw bolts 32 having hook shaped upper ends 33 which hook over said flange 31, while their lower ends extend downwardly through the upper heating plate 21, said lower ends being threaded to receive nuts 34, which are adapted to engage the under marginal edges of the depending peripheral flange 21', and thus firmly interbind the boiler shell and upper heating plate 21 together.

The reference character 35 indicates a feed water reservoir which is mounted upon and suitably secured to said base 10 adjacent to one side of said casing or shell 12. Securely fitted into the upper open end of said reservoir 35 is an annular frame or ring 36, provided at its inner underside with a depending annular flange 37 spaced concentrically relative to the sides of said reservoir. Secured to the inner and outer circumferential faces of said flange 37 are concentrically spaced depending annular baffle members 38 and 39. Secured within the lower portion of said reservoir 35 is an upwardly extending annular baffle member 40, the upper free marginal portion of which projects intermediate the lower free marginal portions of said respective baffle members 38 and 39. Secured to the upper open end of said reservoir 35, by being bolted or otherwise fastened to the frame or ring 36, is a cover or top-plate 41 which closes the upper open end of said reservoir.

Water communication is established between the interior of the boiler shell 26 and the interior of said water reservoir 35 through a suitable intercommunicating passage or water conduit 42, which may be formed by alined nipples or union members 43 and 44 respectively secured to the boiler shell 26 and reservoir 35, with their outer meeting ends registered and secured together by any convenient means. A similar intercommunicating pressure compensating passage or conduit 45 is provided above the normal water-line or level of the boiler shell 26 and reservoir 35, which may also be formed by alined nipples or union members 46 and 47 respectively secured to the boiler shell 26 and cover or top plate 41 of the reservoir 35, with their outer meeting ends registered and secured together by any convenient means.

Said cover or top plate 41 is provided with a laterally and outwardly projecting extension 48 which provides a housing for a float actuated valve lever mechanism to be subsequently described. Provided in the central portion of said cover or top plate 41 is a water intake port 49. Bolted or otherwise secured to said cover or top plate 41 is a water intake valve housing or casing 50, the upper end of which is provided with an internally threaded opening 51 for operatively connecting therewith a suitable water supply pipe or conduit (not shown). Fitted into and secured within said valve housing or casing 50 is a strainer or filter cage 52 of any suitable form, adapted to prevent foreign substances accompanying the water from entering the reservoir. Secured within said valve housing or casing 50, so as to be disposed at the inner side of said strainer or filter cage 52, and so as to be alined vertically above said water intake port 49, is a valve-seat member 53 provided with a central water passage. Slidably supported, by its ribbed shank 54, within said water intake port 49, is a valve piece 55, having at its upper end a suitable resilient valve disc or facing 56 adapted to be moved into closed engagement with said valve-seat member 53. Arranged intermediate the under side of said valve-seat member 53 and the upper end of said valve piece 55 is a coiled compression spring 57, which tends to move the valve-piece to opened position. The lower extremity of said ribbed shank 54 of said valve piece 55 projects downwardly into the upper interior of said reservoir 35. Disposed within the interior of said reservoir 35 is a float-member 58 of any suitable construction. Journaled in transverse position in the side walls of said housing extension 48 is rotable pivot shaft 59, to which is secured, by a pin and slot connection 60 or otherwise, a primary lever 61, the inner free end 62 of which is disposed above said float-member 58, so as to be operatively engaged thereby. The outer end 63 of said primary lever 61 is pivotally interconnected through a link 64 with the outer end of an adjustably pivoted secondary lever 65, the inner free end 66 of which operatively engages the lower end of said shank 54 of the valve piece 55. When a desired level of water within the reservoir 35 is attained, the buoyant float member 58 thrusts upwardly against the end 62 of the primary lever 61, thus turning the same on its fulcrum to depress its outer end 63, and through the link connection 64 in turn depressing the outer end of the secondary lever 65, whereby the latter is turned on its fulcrum to swing its inner end 66 upwardly to raise the valve piece 55, so that the same is carried into closed relation to the valve-seat member 53, thus shutting off the flow of water into the reservoir from the source of supply. As will be understood, a lowering of the water level within the reservoir will carry the float member away from the primary lever 61, whereupon the pressure of the spring 57 on the valve-piece 55 will not only thrust the latter downwardly to open position, so that water from the source of supply may again pass through the valve into the reservoir, but will also reverse the movements of the secondary and primary levers, whereby such reverse movements, if continued to a proper degree, are utilized to actuate an emergency electrical cut-out for interrupting the supply of electrical energy to the electric heater of the steam generator, all in a manner and by means to be subsequently more fully described.

Since the water reservoir 35 and boiler shell 26 are intercommunicating, the water-level attained in the former will determine the water level in the latter. It is desirable, for the most efficient operation of the generator, that a predetermined volume of water be maintained in the boiler shell 26. The predetermination of water volume is attained by governing the water-level in the reservoir 35 at a properly adjusted height. This result is accomplished by adjusting the lever mechanism so that it is effectively actuated by the float member, to close the water admission valve, only when the float member is buoyed to a particular height. The means for thus adjusting the lever mechanism consists in providing an adjustable fulcrum pivot for the secondary lever 65, comprising a rotatable stud 67 journaled in a wall of said housing extension 48, the same having a slotted head 68 at its outer end for turning the same, and having at its inner end a fulcrum or pivot pin 69 eccentrically related to the axis of said stud 67. Surrounding said head 68 is an internally threaded boss 70 in which is threaded a lock-nut 71, which when screwed home clamps the head against rotation, to thus fix the stud 67 and its pivot pin in desired adjusted position. By the described means the fulcrum of the secondary lever 65 may be raised or lowered, such movements respectively tending, on the one hand, to raise the outer end of the secondary lever 65 and the inter-connected outer end of the primary lever 61 to depress the inner end 62 of the latter, so that it is sooner acted upon by the float member 58, thus closing the water admission valve when a lower water lever is attained in the reservoir 35, and, on the other hand, to lower the outer ends of the secondary lever 65 and primary lever 61 to raise the inner end 62 of the latter, so that it is later acted upon by the float member 58, thus closing the water admission valve when a higher water level is attained in the reservoir 35.

The heretofore described overlapped baffle members 38, 39 and 40, which are interposed between the water passage or conduit 42 and the interior of the reservoir 35, serve both to prevent undue agitation of the water flowing from the reservoir into the boiler shell 26, as well as a means for effecting settlement out of the water of foreign substances or sediment contained in the water, and which it is desirable to exclude from the boiler shell 26.

Connected with the dome of the boiler shell 26 is a nipple or other suitable fitting 72 providing a steam outlet passage 73. Said nipple or fitting 72 projects outwardly above the casing or shell 12, and is provided at its exterior end with a threaded extension 74, upon which is secured a steam control valve. This steam valve preferably consists of a casing 75 provided with two discharge ports or outlets 76 and 77, one of which, as the port or outlet 76, is connected by suitable union devices 78 with a conduit 79 for conducting the steam to the particular appliance to be served by the generator; the other port or outlet, as 77, is adapted to discharge steam to the atmosphere, either directly, or through a suitable conduit 80 connected therewith by suitable union devices 81. Rotatably mounted in said valve casing 75 is a valve member 82 adapted to be actuated by a handle device 83 connected on its exteriorly projected stem 84. Said valve member 82 has an intake port 85 which constantly communicates with the steam outlet passage 73 of the boiler shell 26, and a two-way discharge port comprising a branch 86 movable into alinement with said casing outlet 76 when the valve member is turned in one direction, and a branch 87 movable into alinement with said casing outlet 77 when the valve member is turned in the opposite direction. The handle member 83 may be provided with stops 88 which respectively stop the rotation of the valve member to determine the respective operative positions thereof. When the valve member is operated to shut-off the supply or delivery of steam to the appliance being served by the generator, the steam will be at once discharged through the opposite side of the valve to the atmosphere, thus not only permitting a constant pressure of steam to be maintained in the boiler casing, and also assuring that the steam is not shut-off from escaping from the boiler at any time, whether the steam is being utilized or not, the latter function assuring safety in the operation of the generator, since it prevents the building up or accumulation of undue steam pressure within the generator. In order to make assurance of safety doubly sure, there may also be provided a safety valve 89, preferably of the poppet type, which for convenience may be connected with the housing extension 48.

Connected with said water reservoir 35 is a water level indicator, comprising a chambered body 90 having an internal annular shoulder 91 against which is seated a transparent outer wall member 92 of glass, the latter being retained against the seat by a threaded keeper ring 93 which screws into the internally threaded open end of said body 90. The transparent wall member 92 is spaced outwardly from the back wall of the body 90, thus providing a water chamber 94 behind the transparent wall member. The body 90 is secured to the reservoir 35 by hollow tubular screws 95 and 96, the lower screw affording communication between the interior of the reservoir below the normal water level thereof, so that water may enter therethrough into the water chamber 94, while the upper screw affords communication between the interior of the reservoir above the normal water level thereof, so that internal pressures within the water chamber 94 and reservoir 35 are equalized. Since the water level in the reservoir determines the water level in the boiler shell 26, it is, of course, the same in the latter as in the former, and consequently the water level indicator indicates the water level in the boiler chamber as well as in the reservoir.

It is desirable, if for any reason the supply of water to the feed water reservoir should fail, to provide a means for automatically cutting off the supply of electrical energy to the heater wires or other conductive elements 22, so that exhaustion of the water in the boiler shell 26 is not followed by the burning out of the boiler shell and heating element, or other injury to the generator caused by continued application of heat under such circumstances. Such an automatic cut-off is provided in a form adapted to be actuated by the float controlled lever mechanism above described. This cut-off mechanism comprises a base-member 97 which is suitably fixed to the exterior side of said housing extension 48, in such position that the exterior end of said pivot shaft 59 of the primary lever 61 may extend therethrough. Secured to said base member 97 is a cylindrical casing 98, in the outer end of which are secured a pair of stationary contacts 99 and 100 to the outer ends of which are respectively secured electrical circuit wires 101 and 102. A cover shell 103 may be sprung over the outer end of said casing 98 to enclose the outer ends of said contacts 99 and 100, said cover shell having a tubular neck through which may extend the cable 104 which carries said circuit wires 101 and 102. Secured upon the end of the pivot shaft 59, by a fastening pin or key 105, is a rotor block 106 made of suitable insulation material, and adapted to be rotated by the movements of said pivot shaft 59. Fixed upon the free end of said rotor block 106, so as to be rotated thereby, is a bridge contact 107 having oppositely extending arcuate spring arms 108 and 109 which respectively normally engage the respective fixed or stationary contacts 99 and 100. Supported in connection with said supporting flange 23 of the lower heater plate 20 is a suitably insulated binding post 110. When suitable electric service wires are coupled with the respective positive and negative plugs or terminals 24 and 25, and the positive pole of the heater wires or other conductive elements 22 is electrically connected with the positive plug or terminal 24, the negative pole of the heater wires or other conductive elements 22 is connected with one side of said binding post 110 to the opposite side or end of which is connected the circuit wire 101, thus causing the current to traverse the contact 99, bridge contact 107, contact 100 to the circuit wire 102, the outer end of which is connected with the negative plug or terminal 25, thus completing the electric circuit through the heater means and said automatic cut-off. So long as the water level is maintained in the reservoir and boiler shell, within a normal range of fluctuation, the respective arcuate arms 108 and 109 will remain in contact with the stationary contacts 99 and 100, and the electric circuit will remain closed through the heating element. If, for any reason the water supply to the reservoir 35 is interrupted, so that no water enters through the admission valve when the latter is open, it will follow that the water consumed in the boiler shell 26 will not be replaced, and consequently the water level in the reservoir will fall below the minimum of a normal range of fluctuation. When this occurs the float-member will also drop down to such an extent, that the lever mechanism will describe a maximum turning movement, which turning movement is transmitted through the primary lever 61 to the pivot shaft 59 and rotor block 106, and consequently the latter will be turned sufficiently to remove the arcuate arms 108 and 109, thus interrupting the flow of electric current through the heater circuit, until a normal rise of water in the reservoir restores the above mechanism to normal circuit closing position again. It will thus be understood, that the described automatic cut-out affords a safety factor, and assures the boiler and other parts of the generator apparatus against injury by burning.

It may also be desirable to provide a thermostatic control of the electric heater means, so that the temperature of the latter does not exceed a desired maximum degree. I have shown in Figure 2 of the drawings the connection in the heater circuit of a suitable electric thermostat, the same being connected between the positive plug or terminal 24 and the positive pole of the electric heater wires or other conductive elements 22. The form of this thermostat device may be varied, but preferably comprises an adjustable contact 111, electrically connected with said positive plug or terminal 24 in a suitable manner, and an expansive thermostatic contact spring 112, suitably mounted within the casing or shell 12, and electrically connected with the positive pole of the heater wires or conductive elements 22. Under normal temperatures the contact spring 112 engages the adjustable contact 111, and thus maintains the circuit through the heating means closed. If, however, the temperature of the heating means exceeds a desired maximum, the contact spring 112 will expand sufficiently to interrupt the engagement thereof with the adjustable contact 111, whereupon the heater circuit will be broken until normal desired temperature is attained, and the thermostat contacts are again engaged.

From the above description it will be understood, that my present invention provides a novel construction of steam generator, provided with electrical heating means, and with a novel means for automatically controlling and regulating the supply of water thereto to replace consumption. It will also be apparent that specifically the electric heater means includes both an emergency electrical cut-out means, operative upon failure of water supply to the generator, and, if desired, electro-thermostatic means for regulating and controlling the degree of heat desired to be generated by the heater means. The operation and advantages of the novel construction of generator it is believed, will be understood from the above description, without necessity for further amplification.

I am aware that some changes may be made in the general arrangements and combinations of the various devices and parts of my novel electric steam generator apparatus, as well as in the details of the construction of the same, without departing from the scope of my present invention as described in the foregoing specification, and as defined in the appended claims. Hence, I do not limit my invention to the exact arrangements and combinations of the devices and parts as set forth in the foregoing specification, nor do I confine myself to the exact details of the construction of said parts as illustrated in the accompanying drawings.

I claim:—

1. In a feed water reservoir for balanced communication with a steam boiler to be served thereby, a water admission valve at the upper end of said reservoir for delivering water into the latter from a source of supply, a free float member within said reservoir, and a lever mechanism engageable by said free float member and actuated by upward thrust thereof to close said water admission valve, said lever mechanism comprising a primary lever having a fixed fulcrum, one end of said primary lever being located in the path of movement of said float member, a secondary lever having an adjustable fulcrum, one end of said secondary lever operatively engaging said water admission valve, and the opposite ends of said primary and secondary levers being pivotally interconnected by a link.

2. In a feed water reservoir for balanced communication with a steam boiler to be served thereby, a water admission valve for delivering water into said reservoir from a source of supply, a float in said reservoir, means actuated by said float for automatically controlling the operation of said water admission means, a filter strainer mounted on the exterior side of said water admission valve, and a series of spaced apart baffle members concentric to said float and interposed between the interior of said reservoir and the under water level point of communication thereof with the boiler served thereby.

3. In a feed water reservoir for balanced communication with a steam boiler to be served thereby, a water admission valve for delivering water into said reservoir from a source of supply, a float in said reservoir, means actuated by said float for automatically controlling the operation of said water admission means, and a series of spaced apart baffle members concentric to said float interposed between the interior of said reservoir and the under water level point of communication thereof with the boiler served thereby.

In testimony that I claim the invention set forth above I have hereunto set my hand this 20th day of October, 1924.

CHARLES A. BREWER.